Sept. 26, 1950  H. H. KUNKEL  2,523,832
AGRICULTURAL CREEPER AND HARVESTER
Filed Aug. 4, 1947  2 Sheets-Sheet 1
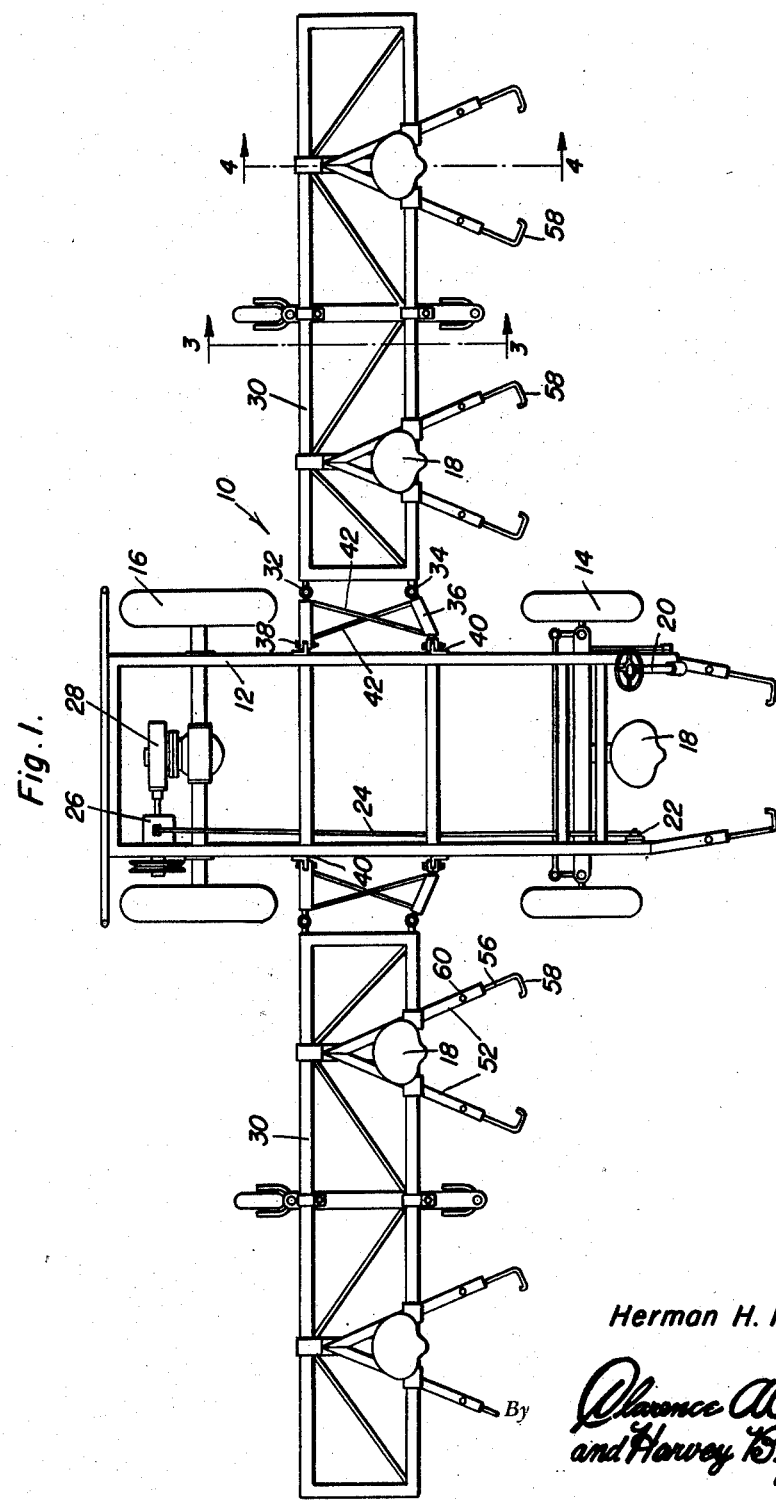
Inventor
Herman H. Kunkel
By *Clarence A. O'Brien
and Harvey B. Jackson*
Attorneys Sept. 26, 1950     H. H. KUNKEL     2,523,832
AGRICULTURAL CREEPER AND HARVESTER
Filed Aug. 4, 1947     2 Sheets-Sheet 2
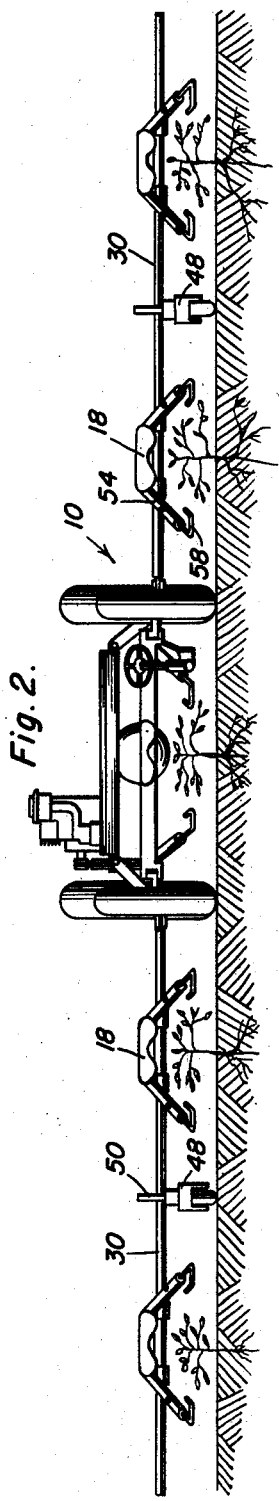
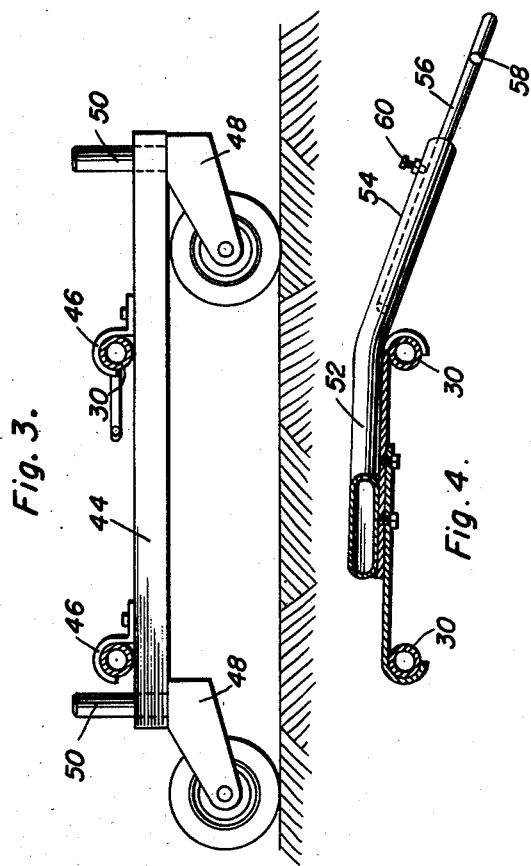
Inventor
Herman H. Kunkel Patented Sept. 26, 1950

2,523,832

UNITED STATES PATENT OFFICE 2,523,832

AGRICULTURAL CREEPER AND HARVESTER

Herman H. Kunkel, Eugene, Oreg.

Application August 4, 1947, Serial No. 765,974

1 Claim. (Cl. 296—65)

This invention comprises novel and useful improvements in agricultural creeper and harvesters and more specifically pertains to a wheel support for transporting workers and their equipment during harvesting or working crops or the like.

The primary purpose of this invention resides in providing an agricultural device for conveniently and comfortably supporting a plurality of workers and transporting them in proper position across a garden for harvesting or otherwise working crops therein.

A further purpose of the invention resides in providing an agricultural device in accordance with the preceding object wherein ample provision is made for irregularities of ground encountered during the movement of the machine over a garden during harvesting.

A further important purpose of the invention resides in providing a harvesting device in conformity with the foregoing objects wherein the position of the supports for the feet of the workers may be adjusted with respect to the terrain over which the device passes.

A still further important purpose of the invention resides in providing an apparatus conforming to the above mentioned objects which is capable of compact collapsing and folding when not in use and may be easily assembled into operative position as desired.

And a final important purpose of the invention to be specifically enumerated herein resides in providing a harvesting implement as set forth in the above mentioned objects wherein the control for the speed of movement and the steering of the device shall be conveniently accessible to the operator of the machine.

These, together with various ancillary objects of the invention which will later become apparent as the following description proceeds, are attained by this device, a preferred embodiment of which has been illustrated, by way of example only in the accompanying drawings, wherein:

Figure 1 is a top plan view illustrating the improved harvester and agricultural implement;

Figure 2 is a front elevational view thereof showing the manner of utilizing the device to harvest crops;

Figure 3 is a vertical transverse sectional view taken substantially on the plane of section line 3—3 of Figure 1 with the foot rests, tubular supporting rods and seat removed; and, Figure 4 is an enlarged fragmentary sectional detail view, parts being shown in elevation, taken substantially on the plane of section line 4—4 of Figure 1 with the seat removed.

Referring now more specifically to the attached drawings, wherein like numerals designate similar parts throughout the various views, 10 designates the implement in its entirety which is shown as comprising a wheeled chassis 12 of any suitable construction and provided with front wheels 14 which are suitably connected for steering and with rear wheels 16 which are connected with a power means for making the device self-propelling.

At the front of the chassis is provided a seat 18 for supporting the operator of the device in convenient position to a suitable steering mechanism indicated generally at 20, a transmission control means indicated at 22 which by means of a control rod 24 extending the length of the chassis 12 operates a transmission indicated generally at 26 for controlling or regulating the speed of operation of the rear driving wheels 16 from a motor not shown and through a differential mechanism indicated at 28.

As will be readily understood, the chassis 12 may conveniently be formed from a new or discarded and reconverted automotive vehicle chassis, or if desired may be formed of any suitable material and be powered by any suitable means such for example as a small gasoline motor suitably mounted thereon and connected through reduction gearing of the transmission 28 for driving the rear wheels 16 and the device at a relatively slow speed suitable for harvesting crops.

Extending laterally from the chassis 12 and hingedly and pivotally connected thereto, are wings or supporting arms 30 preferably of an open, light, framework construction and upon which are secured a plurality of supporting seats 18 together with leg supports for the operator of a construction to be later described.

The wings 30 are hinged as at 32 and 34 to the outer terminals of links 36 which are pivoted as at 38 to brackets 40 carried by the frame 12 for vertical movement relative thereto. Cross braces 42 extend between the links 36 to impart rigidity to the structure when the same is assembled. Obviously, the pivotal connection 38 permits the individual wings to raise or lower relative to the chassis 12 in order that the same may accommodate itself to uneven terrain over which the device passes, while one of the hinges 32 or 34 may be selectively removed to permit the wings to fold back against the chassis and thereby render the device more compact for storage or transportation purposes when not in use.

Each of the wings 30 is provided with one or more wheeled supporting carriages indicated in Figure 3, consisting of a base plate 44 having detachable brackets 46 for securing the side members of the frame 12 thereto, and further provided with casters 48 swivelly mounted at the opposite extremities of the plate 44.

It is contemplated that the pintles 50 of the casters 48 which are journaled in the extremities of the base plate 44, may be adjusted vertically thereof by any suitable means not shown, in order to raise or lower the plate 44 and the supported wing structure 30 and thereby position the seats 18 of the pickers at any desired elevation above the ground for convenient handling of the crops over which the device passes.

As indicated in Figure 1 and shown best in Figure 4, the leading edge of the wings 30 has rigidly attached thereto tubular supporting rods 52 having outwardly and downwardly directed extremities 54. Slidably received in the open outer ends of these extremties are the inner ends of rods 56 whose outer extremities are provided with inwardly turned foot rests 58 for receiving and supporting the feet of the pickers. The rods 56 are adjustably received in the extremities 54 and locked in adjusted position by means of a set screw 60 or the like. As shown best in Figure 1, the support rods 52 extend from the front to the rear edges of the wings 30, and are rigidly attached at both points to provide a light but rigid structure. As shown in Figure 2, the spacing of the seats and support rods is such that each of the position of the pickers overlies or is disposed adjacent to a row of plants whereby the same may be readily harvested or cultivated or worked as desired.

In using the device it is contemplated that the operator positioned at the front of the chassis shall control the operation of the motor and the steering of the device as well as harvesting or cultivating the row of plants which he straddles, this being permitted by the relatively slow movement of the device across the garden. The chassis 12 of the apparatus is intended to accommodate suitable baskets or containers for use by the pickers and for transportation after they are filled thereby, while the wings support the containers as they are packed by the pickers.

Obviously by this means a plurality of pickers may simultaneously harvest several rows of crops without the necessity for stopping to empty containers, obtain new containers or the like, since the transportation of containers will accompany the worker in his travel across the field.

From the foregoing it is believed that the manner of operating and constructing the device will be readily understood, and accordingly further explanation is believed to be unnecessary. However, since numerous modifications will readily occur to those skilled in the art after a consideration of the foregoing specification and annexed drawings, it is not intended to limit the invention to the exact construction shown and described, but all suitable modifications and equivalents may be resorted to falling within the scope of the appended claim.

Having described the invention, what is claimed as new is:

In an agricultural implement having a self-propelling wheeled chassis, laterally extending wheeled wings pivoted to said chassis, and a plurality of seats mounted on said wings; foot rests comprising forwardly extending holders secured to said wings adjacent said seats and having tubular, downwardly diverging extremities, rods slidable in said tubular extremities, clamping means for adjustably securing said rods in said tubular extremities and foot supports on the outer extremities of said rods.

HERMAN H. KUNKEL.

REFERENCES CITED

The following references are of record in the file of this patent:

UNITED STATES PATENTS

| Number | Name | Date |
|---|---|---|
| 850,458 | Bagley | Apr. 16, 1907 |
| 879,646 | Jones | Feb. 18, 1908 |
| 1,154,763 | Gunderson | Sept. 28, 1915 |
| 1,355,895 | Danielson | Oct. 19, 1920 |
| 1,756,803 | Williams | Apr. 29, 1930 |
| 2,163,850 | Pfister | June 27, 1939 |
| 2,261,354 | Fee | Nov. 4, 1941 |
| 2,267,234 | Garber | Dec. 23, 1941 |
| 2,328,838 | Oberlink | Sept. 7, 1943 |
| 2,422,044 | Ronning et al. | June 10, 1947 |
| 2,453,348 | Spiegl et al. | Nov. 9, 1948 |

FOREIGN PATENTS

| Number | Country | Date |
|---|---|---|
| 286,158 | Germany | July 27, 1915 |
| 527,899 | Germany | June 22, 1931 |